United States Patent
Ido

[11] Patent Number: 5,988,082
[45] Date of Patent: Nov. 23, 1999

[54] GERMINATION PROMOTER AND SOWING METHOD FOR SEEDS OF PLANT

[75] Inventor: Yoichi Ido, Susono, Japan

[73] Assignee: Yazaki Corporation, Tokyo, Japan

[21] Appl. No.: 08/738,706

[22] Filed: Oct. 28, 1996

[30] Foreign Application Priority Data

Oct. 30, 1995 [JP] Japan .................................. 7-281700

[51] Int. Cl.⁶ .................................................. A01C 7/00
[52] U.S. Cl. ........................... 111/200; 111/900; 111/917
[58] Field of Search .................................. 111/200, 900, 111/917; 47/58, 9, 73 F, 74

[56] References Cited

U.S. PATENT DOCUMENTS

| | | | |
|---|---|---|---|
| 3,973,355 | 8/1976 | McKenzie | 47/37 |
| 4,313,967 | 2/1982 | Kahn et al. | 426/327 |
| 4,384,537 | 5/1983 | Dubrucq | 111/2 |
| 4,465,017 | 8/1984 | Simmons | 118/418 |
| 4,715,143 | 12/1987 | Redenbaugh et al. | 47/57.6 |
| 4,917,029 | 4/1990 | Upadhyaya et al. | 111/185 |
| 5,441,877 | 8/1995 | Chiaffredo et al. | 435/176 |
| 5,464,769 | 11/1995 | Attree et al. | 435/240.4 |
| 5,609,684 | 3/1997 | Ido et al. | 118/13 |
| 5,645,093 | 7/1997 | Ido et al. | 134/104.3 |
| 5,683,957 | 11/1997 | Huang et al. | 504/100 |

FOREIGN PATENT DOCUMENTS 58-819  1/1983  Japan .

*Primary Examiner*—Victor Batson
*Attorney, Agent, or Firm*—Armstrong, Westerman, Hattori, McLeland & Naughton

[57] ABSTRACT

A germination promotor for promoting germination of plants, the germination promotor being adapted to hold seeds within a condition of high moisture percent in order to sprout the seeds promptly and uniformly without need for water irrigation, with the result that a high uniform germination and also a high germination percentage are obtained.

5 Claims, 1 Drawing Sheet

GERMINATION PROMOTER AND SOWING METHOD FOR SEEDS OF PLANT

BACKGROUND OF THE INVENTION

1. Field of the Invention

This invention relates to a germination promotor and a sowing method for seeds of a plant, in which the germination promotor facilitates the germination of the plant and a sowing method for the seeds of the plant is implemented.

2. Description of the Prior Art

It is necessary that conditions of sowing seeds, such as water, temperature, and concentration of oxygen are arranged for the purpose of germination of the seeds of the plant. When the seeds are sown in the germination field, if the water in the soil is not enough, or the amount of rainfall after sowing is not enough, only a low percentage of germination in or discontinuous budding results. For this reason, the yield decreases or the harvest disperses, further, with these reasons, the efficiency of the work drops.

Japanese Patent Application Laid-Open No. 58-819 discloses a plant-culture sheet to provide effective utilization of irrigated water.

However, such a plant-culture sheet can not hold water by itself. Therefore, no germination promoting effect is expected on the seeds until the next rainfall after sowing. Since some seeds may sprout before the rainfall, the improvement for uniform germination can not be obtained. In order to cure such a defect, water irrigation is performed for promoting germination. However, the use of irrigation is inconvenient. When water irrigation is adopted for a large germination field, numerous plant-culture sheets become necessary. It is of no practical use.

In a plant-culture sheet, since oxygen which is required for the germination of a plant or growth of the roots and is not included within the gel, the sheet should be thin and water retention is low.

SUMMARY OF THE INVENTION

In view of the foregoing, it is an object of the present invention to provide a germination promotor in which handling is easy and germination is capable of being promoted easily.

According to one aspect of the present invention, for achieving above-mentioned object, there provided a germination promotor which consists of a water-gel.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 1 is a view showing use of one example (triangle pole-shape) of a germination promotor according to the present invention.

DETAILED DESCRIPTION OF THE PREFERRED EMBODIMENTS

Figure 1A:
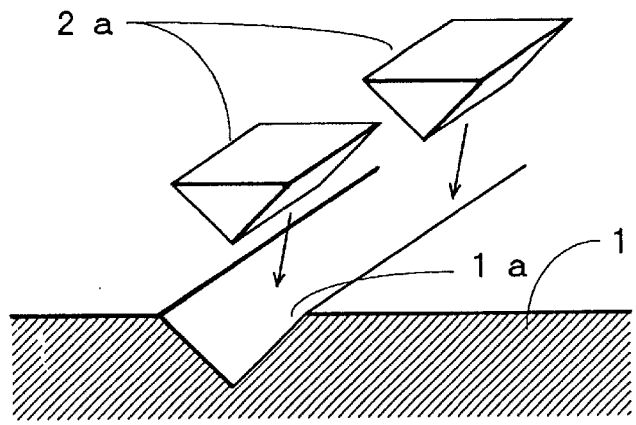
FIG. 1A is a view showing a condition in which a germination promotor is laid on the germination field.

A preferred embodiment of the invention will now be described in detail referring to the accompanying drawings.

In the germination promotor for the seeds according to the present invention, it is necessary that the percent of water content is more than 40% in order to obtain a sufficient effect of the germination promotor, and it is desirable that the percent of water content is more than 80% in order to obtain a very high effect of germination promoting.

The germination promotor is provided in the neighborhood of the seeds which are sown in a germination field. On account of the germination condition, the percent of moisture of the atmosphere surrounding the seeds is high and the seed sprout without delay, such that uniform germination is improved, and a high percent of germination results.

Further, the germination promotors have also an effectiveness in restoring moisture and feeding moisture to the roots, before the seeds sprout. For this reason, there is no necessity for water irrigation for some time after sowing, after germinating, or after budding. Consequently, an improvement of the percent of yield of crops and labor saving also result.

A gel forming principal-ingredient which is employed in the germination promotor, consists of a water-gel. Such gel forming principal-ingredients are alginic acid natrium, xantan gum, carboxymethyl cellulose, pectin, gelatin, and agar-agar. Preferably, these gel forming-principal-ingredients can be used independently, or can be used combined with each other.

When alginic acid natrium or pectin is used, a gel is not formed by only dissolving that single substance. In order to form a gel thereof, it is necessary that a bridge-ingredient including a bridge-ion of calcium, such as in the form of calcium sulfate or the like is added thereto.

A polyphosphoric acid natrium such as tripolyphosphoric acid natrium or the like is preferably added thereto for modulating the operation of the bridge-ingredient.

When carboxymethyl cellulose is used as a gel forming principal-ingredient, it is necessary that a bridge-ingredient such as alum or the like is added thereto.

Furthermore, there is a raw material which requires a high temperature to form a gel in the gel forming manufacturing process. When such a germination promotor is used, an aseptic condition results due to the high temperature processing. Such a germination promotor often becomes a breeding ground for malignancy germs, and then blight of the field crops is easy to generate with the result that the serious anxiety of the deterioration of yield exists. For this reason, it is desirable to use a gel forming-principal-ingredient whose temperature in the gel forming manufacturing process is less then room temperature (at 40° C. maximum).

Moreover, when the germination promotor consist of a water-gel according to the present invention, if it contains a water retentive ingredient, germination of the seeds which require a long period of time to sprout is facilitated. It is possible to supply sufficient moisture to the seeds, with the result that a desirable condition is brought in that the high percentage of germination, and high harvest of the crops are achieved. So-called high polymer absorbent (water absorptive body) are known as water retentive ingredients.

When the germination promotor consists of a water-gel according to the present invention, if manure components which contribute to the growth of that plant are included, since effect of manuring can be obtained, a desirable effect results. The manure components should only contribute to the growth of the plant. For this purpose, one may either us an inorganic fertilizer or an organic fertilizer. However, fertilizers which may harden the water-gel of the germination promotor, and which may collapse the water-gel of there germination promoter should be avoided.

Hydrogen peroxide can be mixed to the raw material such that the water-gel adds an excess of oxygen. In such a case, when the plant root is entered forcibly into the water-gel, not only water but also sufficient oxygen is supplied to the root and acceleration of the growth of the root result.

The germination promotor according to the present invention consisting of the water-gel includes a preservative. It can thus prevent decomposition of the water-gel. As the result, multiplication of malignancy germs which disturb growth of the plant is prevented. Such a germination promotor protects the plant from disease. It is also possible to mix in an agricultural chemical such as an insecticide.

Figure 1B:
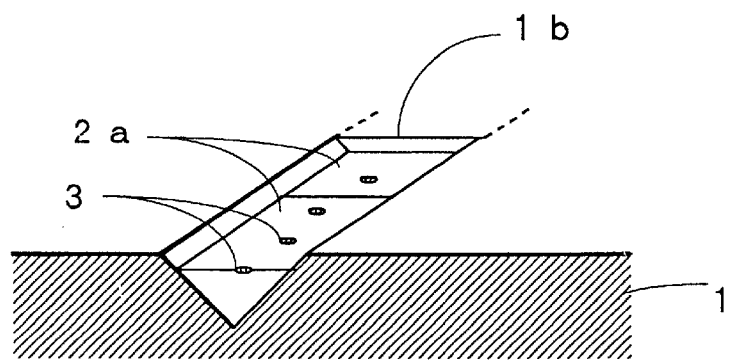
FIG. 1B is a view showing a condition of sowing and covering up seed with soil.

The germination promotor according to the present invention can be formed by casting. Any desirable shape such as a shape of a sheet, a shape of a string, a shape of a block, a spherical shape, a cylindrical shape, a semi-cylindrical shape, or the like, are capable of being formed. For example, as shown in FIGS. 1A and 1B, reference numeral 2a shows a triangular pole shaped germination promotor which is located at V-shaped groove 1a provided at a germination field 1. Plant seeds 3 are sown thereon, and then covered up with soil. In FIGS. 1A and 1B, reference numeral 1b shows soil cover. In this case, the V-shaped groove 1a may be one kind of mould, into which a viscous solution with a property of a water-gel forming a poured, and a germination promotor 2a is capable of being formed.

When the germination promotor is relatively big, hydrogen peroxide is appropriately added to the raw material. The hydrogen peroxide may enter into the water-gel, and sufficient oxygen can be fed to the growing root.

Figure 2:
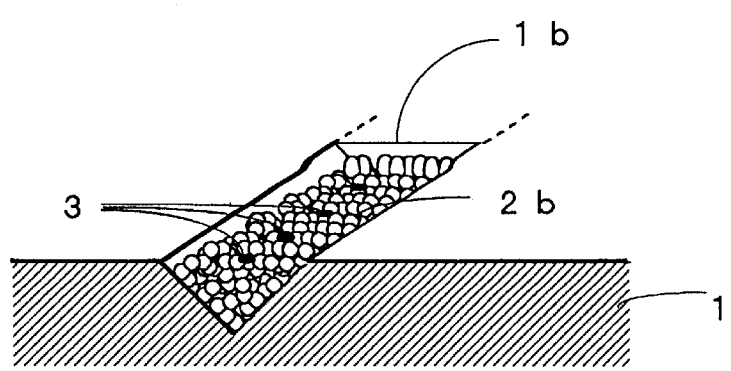
FIG. 2 is a view showing use of another example (globular shape) of a germination promotor according to the present invention.

As shown in FIG. 2, a spherical shaped germination promotor (shown as 2b in FIG. 2) is prepared. Numerous such germination promoters are received in the V-shaped groove provided at the germination field 1. The seeds 3 are sown thereon the covered up with soil. In this case, due to the clearance between the germination promotor, air (oxygen) which is necessary for the growth of the roots of a plant is thus supplied.

With regard to the sowing of the seeds, the seeds should be sown at the appropriate depth, consequently, the above-described groove should be excavated deeply rather than the case of sowing under normal condition.

EMBODIMENT
(Preparation of the Germination Promotor)

A water-organic-gel is made of alginic acid natrium, which is hardened by calcium chloride, with the result that a spherical shaped germination promotor is prepared.

Namely, droplets consisting of alginic acid natrium, 3 weight % solution, are dropped into calcium chloride, 10 weight % solution, from a hollow fine tube. Seven thousand (7000) pieces of a spherical shaped germination promotor are prepared.

An exemplary germination promotor has a spherical shape of 9 mm diameter, a weight of 0.4 g, and a moisture content of 97 weight %, and is transparent. (Sowing on the germination field)

A plurality of V-shaped grooves are excavated such that intervals of strips become 25 cm in the germination field. The spherical shaped germination promotor described above (6000 pieces) are placed therein. Next, 400 grains of the seeds of spinach which were dipped in water for four hours and then dried during a night at room temperature, are plated, before covering up the seeds with soil. Sowing depth is 1.5 cm, and interval between roots is 5 cm.

The germination percentage, 14 days after sowing, was 91%.

COMPARATIVE EXAMPLE

Under the same condition as above embodiment, 400 grains of the seeds of spinach were planted without the germination promotor. The germination percentage, 14 days after sowing, was 67%. No watering irrigation of the above embodiment or the comparative example was preformed.

The effect of the present invention is clear by comparing the embodiment and the comparative example.

A high percent of germination and satisfactory uniform germination are obtained without water irrigation due to employment of the germination promotor of the present invention, with the result that the germination percentage is also good. Consequently, an improvement of yield results. Since the harvesting season is condensed due to the fact that uniform germination is provided, mechanization or elimination of some labor of the harvesting operation is facilitated.

While preferred embodiments of the invention have been described using specific terms, such description is for illustration only, and it is to be understood that changes and variations may be made without departing from the spirit or scope of the following claims.

What is claimed is:

1. A seed germination promotor comprising:
   a water-gel having a moisture content of more than 80% having seed therewith, so as to ensure a high germination ratio in a state with no irrigation during a period between sowing and germination and containing a gel forming principal ingredient selected from a group consisting of alginic acid natrium, xantan gum, carboxymethyl cellulose, pectin, gelatin and agar-agar and mixtures thereof, said germination promotor having a spherical shape.

2. The germination promotor for seeds as defined in claim 1 wherein said water gel also contains hydrogen peroxide. also contains hydrogen peroxide.

3. A method of planting seeds comprising:
   sowing seeds together with a germination promotor having a spherical shape and made of a water-gel having a moisture content of more than 80% , at the time of sowing said seeds, so as to ensure a high germination ratio in a state with no irrigation during a period between sowing and germination and containing a gel forming principal ingredient selected from a group consisting essentially of alginic acid natrium, xantan gum, carboxymethyl cellulose, pectin, gelatin and agar-agar and mixtures thereof.

4. The method of planting seeds as defined in claim 3 wherein said gel forming principal ingredient has a gel forming temperature of no higher than 40° C.

5. The method of planting seeds as defined in claim 3 where said water gel also contains hydrogen peroxide.

* * * * *